(12) United States Patent
Baika et al.

(10) Patent No.: US 6,615,794 B2
(45) Date of Patent: Sep. 9, 2003

(54) DIRECT CYLINDER INJECTION-TYPE SPARK IGNITION INTERNAL COMBUSTION ENGINE

(75) Inventors: Toyokazu Baika, Susono (JP); Tatsuo Kobayashi, Susono (JP); Fumiaki Hattori, Mishima (JP); Takashi Hashima, Susono (JP); Hiroyuki Hokuto, Susono (JP); Toshimi Kashiwagura, Susono (JP); Mutsumi Kanda, Susono (JP); Hiroya Tanaka, Anjo (JP); Souichi Matsushita, Susono (JP); Shizuo Abe, Mishima (JP); Nobuyuki Muramatsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/283,232

(22) Filed: Oct. 30, 2002

(65) Prior Publication Data

US 2003/0051702 A1 Mar. 20, 2003

Related U.S. Application Data

(62) Division of application No. 09/974,054, filed on Oct. 11, 2001, which is a division of application No. 09/348,483, filed on Jul. 7, 1999, now Pat. No. 6,336,437.

(30) Foreign Application Priority Data

Jul. 8, 1998 (JP) .......................... 10-193335

(51) Int. Cl.[7] ................................. F02B 3/00
(52) U.S. Cl. ................ 123/298; 123/305; 123/197.4
(58) Field of Search ................ 123/298, 305, 123/299, 197.3, 197.4

(56) References Cited

U.S. PATENT DOCUMENTS 5,076,220 A * 12/1991 Evans et al. ............ 123/65 VC
5,146,884 A * 9/1992 Merkel ..................... 123/197.4

(List continued on next page.)

FOREIGN PATENT DOCUMENTS

| EP | 454 117 | 10/1991 |
|----|---------|---------|
| EP | 0 496 029 A1 | 7/1992 |
| EP | 0 535 466 A1 | 4/1993 |
| EP | 0 694 682 A1 | 1/1996 |
| JP | 2-122123 | 10/1990 |
| JP | 07150969 | 6/1995 |
| JP | A 8-246878 | 9/1996 |
| JP | A-8-260986 | 10/1996 |
| JP | A 09 158736 | 6/1997 |

Primary Examiner—John Kwon
(74) Attorney, Agent, or Firm—Oliff & Berridge, PLC

(57) ABSTRACT

A direct cylinder injection-type spark ignition internal combustion engine is disclosed. The engine comprises a spark plug, a cavity formed in the top surface of a piston, and a fuel injection valve for injecting fuel into the cavity in nearly the shape of a fan having a relatively small thickness. When the fuel injected in nearly the shape of a fan from the fuel injection valve is considered by being divided into a plurality of fuel segments in a radial direction, a side wall of the cavity has a first fuel deflection passage 82a and a second fuel deflection passage 82b for so deflecting at least two of the plurality of fuel segments as to pass near the spark plug. The side wall of the cavity is at least partly provided with a return portion 83 that protrudes toward the inside of the cavity. The first fuel deflection passage is not provided with the return portion 83 or is provided with the return portion having a short protrusion, and the second fuel deflection passage is provided with the return portion 83 having a long protrusion.

1 Claim, 13 Drawing Sheets

U.S. PATENT DOCUMENTS

| | | | | |
|---|---|---|---|---|
| 5,544,627 A | * | 8/1996 | Terziev et al. | 123/53.1 |
| 5,816,201 A | * | 10/1998 | Garvin | 123/53.1 |
| 6,035,822 A | | 3/2000 | Suzuki et al. | 123/298 |
| 6,035,823 A | | 3/2000 | Koike et al. | 123/298 |
| 6,116,211 A | | 9/2000 | Suzuki et al. | 123/276 |
| 6,227,161 B1 | * | 5/2001 | Urushiyama | 123/197.4 |
| 6,234,138 B1 | * | 5/2001 | Cathey | 123/197.4 |
| 6,336,437 B1 | * | 1/2002 | Baika et al. | 123/298 |
| 6,354,252 B1 | * | 3/2002 | Rabhi | 123/78 BA |
| 6,510,831 B2 | * | 1/2003 | Wiseman | 123/197.4 |

* cited by examiner

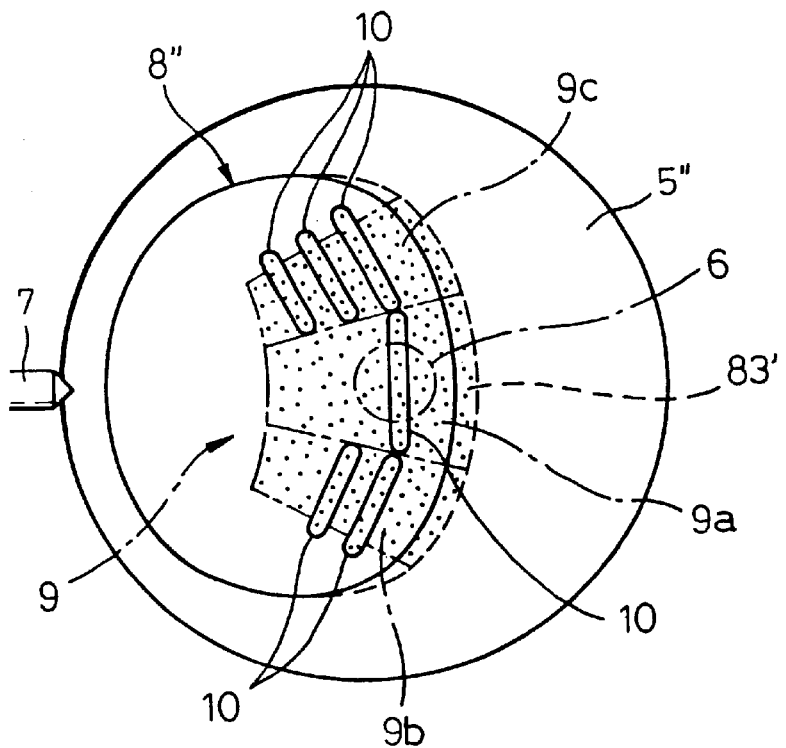
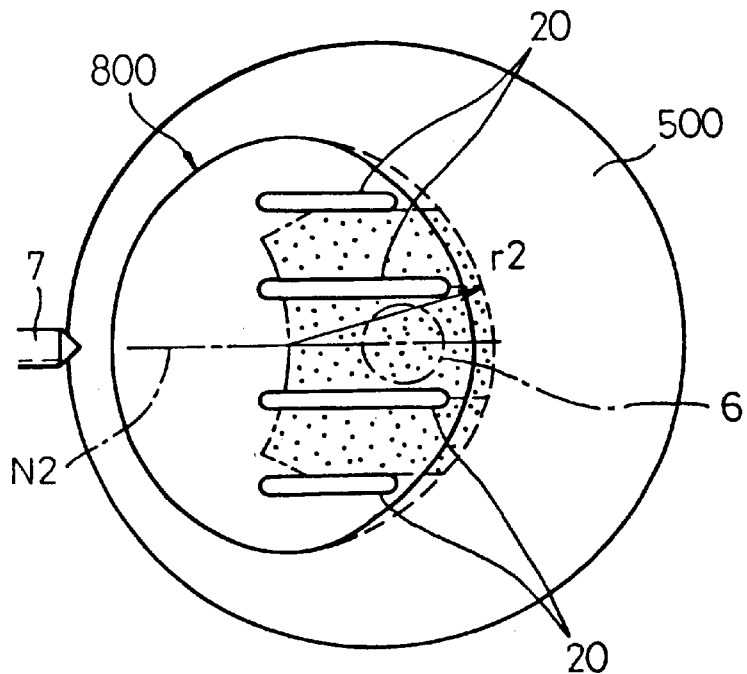

DIRECT CYLINDER INJECTION-TYPE SPARK IGNITION INTERNAL COMBUSTION ENGINE

This is a Division of application Ser. No. 09/974,054 filed Oct. 11, 2001, which in turn is a Division of application Ser. No. 09/348,483 filed Jul. 7, 1999, now U.S. Pat. No. 6,336,437. The entire disclosures of the prior applications are hereby incorporated by reference herein in its entirety.

BACKGROUND OF THE INVENTION

1. Field of the Invention

The present invention relates to a direct cylinder injection-type spark ignition internal combustion engine.

2. Description of the Prior Art

There has heretofore been known to produce stratified charge combustion by directly injecting the fuel into the cylinder to form a mixture in the vicinity only of a spark plug at the ignition timing to burn a lean mixture in the cylinder as a whole. To carry out the stratified charge combustion, in general, the fuel injection valve is opened for only a period required for injecting a required amount of fuel from a crank angle for starting the fuel injection set in the latter half of the compression stroke. It is intended that the thus injected fuel proceeds into a concave combustion chamber formed in the top surface of the piston and is deflected toward the spark plug, due to the shape of the combustion chamber, while being vaporized after robbing heat from the wall surface of the combustion chamber in order to form a mixture that can be favorably ignited near the spark plug.

In general, the fuel injection valve injects fuel in a form that is conically concentrated. Therefore, a relative long period is required while the fuel injected in the last stage of fuel injection becomes a combustible mixture utilizing the heat from the wall surface of the combustion chamber. To ensure this period, therefore, the fuel-injection end timing must be advanced. An amount of fuel which can be injected in the latter half of the compression stroke, therefore, inevitably decreases, and the stratified charge combustion must be abandoned in high engine load operations in which a relatively large amount of fuel is required. It has therefore been desired to carry out stratified charge combustion, which is effective in decreasing the consumption of fuel, over a wide range of engine operation conditions.

Japanese Unexamined Patent Publication (Kokai) No. 9-158736 proposes injecting the fuel in the shape of a flat fan having a relatively small thickness by using a fuel injection valve having an injection hole in the shape of a slit. The thus injected fuel can rob heat from a wide area of the wall surface of the combustion chamber, making it possible to form a combustible mixture within a short period and to retard the timing for ending the injection of fuel. It is therefore possible to increase an amount of fuel injected in the latter half of the compression stroke and to expand the region of stratified charge combustion toward the high engine load side.

According to the prior art as described above, even if the timing for ending the injection of fuel is retarded, a combustible mixture can be reliably formed from the injected fuel at an ignition timing. The thus formed combustible mixture has a flat shape with its length being shorter than the width thereof and rises nearly in the direction of the length. The ignition timing must occur while the combustible mixture is rising and is coming in contact with the spark plug. However, the combustible mixture has a relatively short length and stays contacted to the spark plug while it is rising for only a relative short period. Therefore, it may often happen that the combustible mixture has already passed over the spark plug at the ignition timing due to a slight deviation in the timing for forming the combustible mixture, and the reliable ignition performance is not maintained.

SUMMARY OF THE INVENTION

The object of the present invention therefore is to reliably maintain the ignition performance and to reliably expand the region of the stratified charge combustion toward the high engine load side in a direct cylinder injection-type spark ignition internal combustion engine in which the fuel is injected in the form of a flat fan having a relative small thickness.

According to the present invention, there is provided a first direct cylinder injection-type spark ignition internal combustion comprising a spark plug, a cavity formed in the top surface of a piston, and a fuel injection valve for injecting fuel into the cavity in nearly the shape of a fan having a relatively small thickness, wherein, when the fuel injected in nearly the shape of a fan from the fuel injection valve is considered by being divided into a plurality of fuel segments in a radial direction, a side wall of the cavity has a first fuel deflection passage and a second fuel deflection passage for deflecting at least two of the plurality of fuel segments to pass near the spark plug, the side wall of the cavity is at least partly provided with a return portion that protrudes toward the inside of the cavity, the first fuel deflection passage is not provided with the return portion or is provided with the return portion having a short protrusion, and the second fuel deflection passage is provided with the return portion having a long protrusion.

According to the present invention, there is provided a second direct cylinder injection-type spark ignition internal combustion engine comprising a spark plug, a cavity formed in the top surface of a piston, and a fuel injection valve for injecting fuel into the cavity in nearly the shape of a fan having a relatively small thickness, wherein, when the fuel injected in nearly the shape of a fan from the fuel injection valve is considered as being divided into a plurality of fuel segments in a radial direction, a side wall of the cavity has a first fuel deflection passage and a second fuel deflection passage for deflecting at least two of the plurality of fuel segments to pass near the spark plug, the side wall of the cavity is at least partly provided with an arcuate portion having an arcuate shape in cross section in the vertical direction, and a radius of curvature of the arcuate shape of said arcuate portion on said first fuel deflection passage is larger than that of said arcuate portion on said second fuel deflection passage.

According to the present invention, there is provided a third direct cylinder injection-type spark ignition internal combustion engine comprising a spark plug, a cavity formed in the top surface of a piston, and a fuel injection valve for injecting fuel into the cavity in nearly the shape of a fan having a relatively small thickness, wherein, when the fuel injected in nearly the shape of a fan from the fuel injection valve is considered as being divided into a plurality of fuel segments in a radial direction, a side wall of the cavity has a first fuel deflection passage and a second fuel deflection passage for deflecting at least two of the plurality of fuel segments to pass near the spark plug, the side wall of the cavity is at least partly provided with a return portion that protrudes toward the inside of the cavity, the side wall of the cavity inclusive of the return portion has an arcuate shape in cross section in the vertical direction, the first fuel deflection passage is not provided with the return portion or is provided with the return portion having the shortest protrusion, a radius of curvature of the arcuate shape of the first fuel deflection passage is the greatest, and the first fuel deflection passage is closest to the spark plug.

According to the present invention, there is provided a fourth direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein, when the fuel injected in nearly the shape of a fan from the fuel injection valve is considered as being divided into a plurality of fuel segments in a radial direction, the bottom wall of the cavity has a plurality of neighboring fuel leading passages for leading the plurality of fuel segments collided toward the side wall of the cavity, the side wall of the cavity has a first fuel deflection passage and a second fuel deflection passage for deflecting at least two of the plurality of fuel segments led by the plurality of fuel leading passages to pass near the spark plug, and the angle of collision of the fuel in a first fuel leading passage among the plurality of fuel leading passages for leading the fuel segment to the first fuel deflection passage, is smaller than the angle of collision of the fuel in a second fuel leading passage among the plurality of fuel leading passages for leading the fuel segment to the second fuel deflection passage.

According to the present invention, there is provided a fifth direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein, when the fuel injected in nearly the shape of a fan from the fuel injection valve is considered as being divided into a plurality of fuel segments in a radial direction, the bottom wall of the cavity has a plurality of neighboring fuel leading passages for leading the plurality of fuel segments collided toward the side wall of the cavity, the side wall of the cavity has a first fuel deflection passage and a second fuel deflection passage for deflecting at least two of the plurality of fuel segments led by the plurality of fuel leading passages to pass near the spark plug, and the depth near the side wall of the cavity in a first fuel leading passage among the plurality of fuel leading passages for leading the fuel segment to the first fuel deflection passage, is smaller than the depth near the side wall of said cavity in a second fuel leading passage among the plurality of fuel leading passages for leading the fuel segment to the second fuel deflection passage.

According to the present invention, there is provided a sixth direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein, when the fuel injected in nearly the shape of a fan from the fuel injection valve is considered as being divided into a plurality of fuel segments in a radial direction, the bottom wall of the cavity has a plurality of neighboring fuel leading passages for leading the plurality of fuel segments collided toward the side wall of the cavity, the side wall of the cavity has a plurality of fuel deflection passages for deflecting all of the plurality of fuel segments led by the plurality of fuel leading passages to pass near the spark plug, and the lengths in the plurality of fuel leading passages from positions where the fuel collides to points of a predetermined depth of the cavity gradually change.

According to the present invention, there is provided a seventh direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein, when the fuel injected in nearly the shape of a fan from the fuel injection valve is considered as being divided into a plurality of fuel segments in a radial direction, the bottom wall of the cavity has a plurality of neighboring fuel leading passages for leading the plurality of fuel segments collided toward the side wall of the cavity, the side wall of the cavity has a first fuel deflection passage and a second fuel deflection passage for deflecting at least two of the plurality of fuel segments led by the plurality of fuel leading passages to pass near the spark plug, concave or convex resisting portions of a predetermined number are formed on at least one of the second fuel deflection passage and a second fuel leading passage among the plurality of fuel leading passages for leading the fuel segment to the second fuel deflection passage, and the resisting portions of a number smaller than the predetermined number are formed on at least one of the first fuel deflection passage and a first fuel leading passage among the plurality of fuel leading passages for leading the fuel segment to the first fuel deflection passage, or the resisting portions are formed on neither the first fuel deflection passage nor the first fuel leading passage.

According to the present invention, there is provided a eighth direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein, when the fuel injected in nearly the shape of a fan from the fuel injection valve is considered as being divided into a plurality of fuel segments in a radial direction, the bottom wall of the cavity has a plurality of neighboring fuel leading passages for leading the plurality of fuel segments collided toward the side wall of the cavity, the side wall of the cavity has a first fuel deflection passage and a second fuel deflection passage for deflecting at least two of the plurality of fuel segments led by the plurality of fuel leading passages to pass near the spark plug, a first resisting portion of a concave shape having a predetermined depth or of a convex shape having a predetermined height is formed on at least one of the second fuel deflection passage and a second fuel leading passage among the plurality of fuel leading passages for leading the fuel segment to the second fuel deflection passage, and a second resisting portion of a concave shape having a depth smaller than the predetermined depth or of a convex shape having a height smaller than the predetermined height is formed on at least one of the first fuel deflection passage and a first fuel leading passage among the plurality of fuel leading passages for leading the fuel segment to the first fuel deflection passage, or the first resisting portion is formed on neither the first fuel deflection passage nor the first fuel leading passage.

According to the present invention, there is provided a ninth direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein, when the fuel injected in nearly the shape of a fan from the fuel injection valve is considered as being divided into a plurality of fuel segments in a radial direction, the bottom wall of the cavity has a plurality of neighboring fuel leading passages for leading the plurality of fuel segments collided toward the side wall of the cavity, the side wall of the cavity has a first fuel deflection passage and a second fuel deflection passage for deflecting at least two of the plurality of fuel segments led by the plurality of fuel leading passages to pass near the spark plug, and a plurality of guide protuberances are formed on the bottom surface of the cavity to define a first fuel leading passage among the plurality of fuel leading passages for leading the fuel segment to the first fuel deflection passage and a second fuel leading passage among the plurality of fuel leading passages for leading the fuel segment to the second fuel deflection passage, the plurality of guide protuberances being nearly in a linear form, and the angle of deflection of the fuel segment in the first fuel leading passage being smaller than the angle of deflection of the fuel segment in the second fuel leading passage.

According to the present invention, there is provided a tenth direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein, when the fuel injected in nearly the shape of a fan from the fuel injection valve is considered as being divided into a plurality of fuel segments in a radial direction, the bottom wall of the cavity has a plurality of neighboring fuel leading passages for leading the plurality of fuel segments collided toward the side wall of the cavity, the side wall of the cavity has a plurality of fuel deflection passages for deflecting all of the fuel segments led by the plurality of fuel leading passages to pass near the spark plug, and a plurality of guide protuberances are formed on the bottom surface of the cavity to define the plurality of fuel leading passages, the plurality of guide protuberances being nearly in a linear form and nearly in parallel with a plane that passes through the center of the injection hole of the fuel injection valve and the center of the cavity.

According to the present invention, there is provided a eleventh direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein, when the fuel injected in nearly the shape of a fan from the fuel injection valve is considered as being divided into a plurality of fuel segments in a radial direction, the bottom wall of the cavity has a plurality of neighboring fuel leading passages for leading the plurality of fuel segments collided toward the side wall of the cavity, the side wall of the cavity has a first fuel deflection passage and a second fuel deflection passage for deflecting at least two of the plurality of fuel segments led by the plurality of fuel leading passages to pass near the spark plug, and a plurality of guide protuberances are formed on the bottom surface of the cavity to define a first fuel leading passage among the plurality of fuel leading passages for leading the fuel segment to the first fuel deflection passage from a second fuel leading passage among the plurality of fuel leading passages for leading the fuel segment to the second fuel deflection passage, the plurality of guide protuberances being in a curved form, and the center lines in the first fuel leading passage and in the second fuel guide passage defined by the plurality of guide protuberances have such shapes that a radius of curvature of the center line of the first fuel leading passage is larger than a radius of curvature of the center line of the second fuel leading passage or the center line of the first fuel leading passage is straight.

According to the present invention, there is provided a twelfth direct cylinder injection-type spark ignition internal combustion engine comprising a spark plug, a cavity formed in the top surface of a piston, and a fuel injection valve for injecting fuel into the cavity in nearly the shape of a fan having a relatively small thickness, wherein the cavity has a side wall for deflecting all the fuel to pass near the spark plug, and a plurality of deflection guide protuberances are formed in the cavity to deflect the fuel in the direction of width thereof.

According to the present invention, there is provided a thirteenth direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein the fuel that has collided with the bottom wall of the cavity travels toward the side wall of the cavity along the bottom wall, the side wall of the cavity deflects the whole fuel that has arrived at the side wall to pass near the spark plug, and the bottom wall of the cavity is inclined from one side end of the fuel travelling on the bottom wall toward the other side end thereof.

According to the present invention, there is provided a fourteenth direct cylinder injection-type spark ignition internal combustion engine comprising a spark plug, a cavity formed in the top surface of a piston, and a fuel injection valve for injecting fuel in nearly the shape of a fan having a relatively small thickness so that the fuel collides with a bottom wall of the cavity at an acute angle, wherein the fuel that has collided with the bottom wall of the cavity travels toward the side wall of the cavity along the bottom wall, and a vertical plane at the center of the side wall of the cavity in a range at where the fuel arrives intersects a vertical plane at the center of the fuel at a predetermined angle.

According to the present invention, there is provided a fifteenth direct cylinder injection-type spark ignition internal combustion engine comprising a spark plug, a cavity formed in the top surface of a piston, a means for forming a swirl that rotates in a cylinder in nearly the horizontal direction, and a fuel injection valve for injecting fuel into the cavity in nearly the shape of a fan having a relatively small thickness, wherein the cavity has a side wall for deflecting all the fuel to pass near the spark plug, and a protruding portion is formed on the top surface of the piston corresponding to at least the side wall of the cavity over a range for deflecting the fuel.

According to the present invention, there is provided a sixteenth direct cylinder injection-type spark ignition internal combustion engine comprising a spark plug, a cavity formed in the top surface of a piston, and a fuel injection valve for injecting fuel into the cavity in nearly the shape of a fan having a relatively small thickness, wherein the cavity has a side wall for deflecting all the fuel to pass near the spark plug, and a squish area is formed on the top surface of the piston to generate a squish that travels chiefly in the direction of width of the fuel to pass near the spark plug.

According to the present invention, there is provided a seventeenth direct cylinder injection-type spark ignition internal combustion engine comprising a spark plug, a cavity formed in the top surface of a piston, and a fuel injection valve for injecting fuel into the cavity in nearly the shape of a fan having a relatively small thickness, wherein a squish area is formed on the top surface of the piston to generate a squish that travels chiefly toward the fuel injection valve from the side opposing the fuel injection valve to pass near the spark plug, and a plurality of stepped portions are formed in the cavity, which portions are successively collided with by the fuel injected from the fuel injection valve accompanying the rise of the piston, at least two of the stepped portions which are collided with by the fuel, when an amount of fuel injected is small, deflect the collided fuel, in parallel, toward the upstream side of the squish beyond the spark plug.

According to the present invention, there is provided a eighteenth direct cylinder injection-type spark ignition internal combustion engine comprising a spark plug and a fuel injection valve for directly injecting fuel into the cylinder, wherein the fuel injected from the fuel injection valve passes near the spark plug directly or after being deflected, and the injection rate of the fuel injection valve is decreased in the last stage of fuel injection.

According to the present invention, there is provided a nineteenth direct cylinder injection-type spark ignition internal combustion engine comprising a spark plug and a fuel injection valve for directly injecting fuel into the cylinder, wherein the fuel injected from the fuel injection valve passes near the spark plug directly or after being deflected, and a crank mechanism has the center of the crank shaft deviated from the center axis of the piston so that the angular speed of the crank is lowered in the compression stroke.

BRIEF DESCRIPTION OF THE DRAWINGS

FIG. 9 is a plan view of a piston illustrating the direct cylinder injection-type spark ignition internal combustion engine according to a fifth embodiment of the present invention;

FIG. 10 is a plan view of a piston illustrating the direct cylinder injection-type spark ignition internal combustion engine according to a sixth embodiment of the present invention;

DESCRIPTION OF THE PREFERRED EMBODIMENTS

Figure 1:
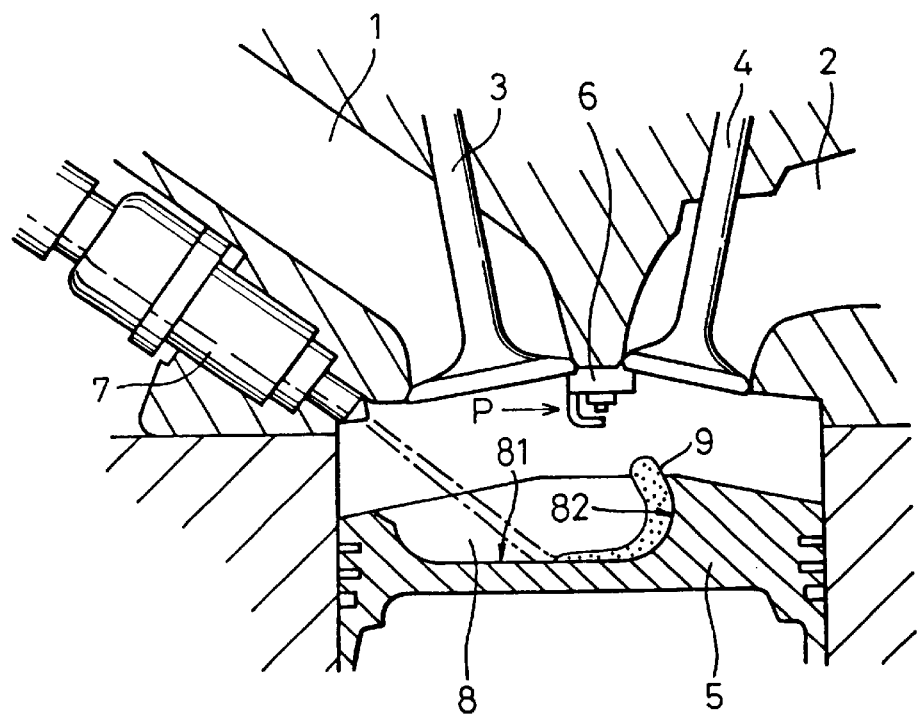
FIG. 1 is a vertical sectional view schematically illustrating a direct cylinder injection-type spark ignition internal combustion engine according to a first embodiment of the present invention.
Figure 2:
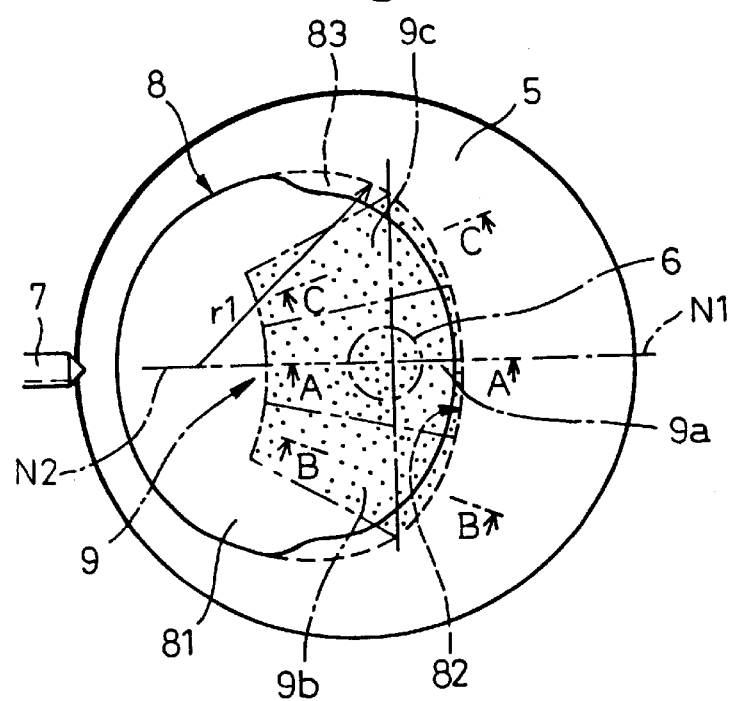
FIG. 2 is a plan view of a piston shown in FIG. 1.

FIG. 1 is a vertical sectional view schematically illustrating a direct cylinder injection-type spark ignition internal combustion engine according to a first embodiment of the present invention, and FIG. 2 is a plan view of a piston shown in FIG. 1. In these drawings, reference numeral 1 denotes an intake port and 2 denotes an exhaust port. The intake port 1 is communicated with the interior of the cylinder through an intake valve 3, and the exhaust port 2 is communicated with the interior of the cylinder through an exhaust valve 4. Reference numeral 5 denotes a piston, and 6 denotes a spark plug arranged at an upper portion nearly at the center of the cylinder. A fuel injection valve 7 injects fuel in the shape of a fan having a relative small thickness in a manner that the center of width of the fuel is nearly in agreement with the center of the cylinder.

In a homogeneous combustion region where a high engine output is required, the fuel injection valve 7 injects fuel in a required amount in the intake stroke thereby to form a homogeneous mixture in the cylinder at the ignition timing. In a stratified charge combustion region, on the other hand, the fuel injection valve 7 starts injecting the fuel from a crank angle set for every engine operation to inject fuel in a required amount in the latter half of the compression stroke. As shown in FIG. 1, the fuel injected in the latter half of the compression stroke proceeds into a concave cavity 8 formed in the top surface of the piston 5, collides with a bottom wall 81 of the cavity 8 and proceeds toward a side wall 82 along the bottom wall 81, and is then deflected toward this side and up along the side wall 82 so as to be directed to the spark plug 6. In the following description, the word "this side" means the side of the fuel injection valve.

The fuel injected by the fuel injection valve 7 is of a flat fan shape having a relative small thickness. Therefore, the fuel after having collided with the bottom wall 81 of the cavity 8 travels on the bottom wall 81 and the side wall 82 of the cavity 8 while spreading in the direction of width as represented by dots in FIG. 2, and favorably absorbs heat from the cavity 8 to form, within a short period, a mixture (hereinafter referred to as combustible mixture) that can be favorably ignited. To realize the stratified charge combustion, at least the fuel injected at the last stage of fuel injection must be forming a combustible mixture at the ignition timing. Upon injecting the fuel in the flat fan shape having a relative small thickness, it is possible to shorten the period from the end of the fuel injection to the ignition timing, i.e., it is allowed to retard the end of fuel injection, so that a relative large amount of fuel can be used for forming a combustible mixture at the ignition timing.

Figure 4A:
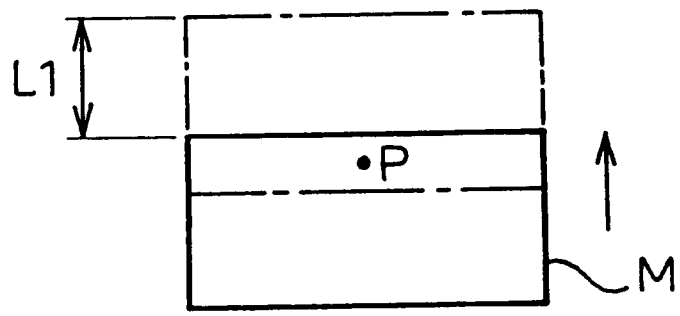
FIG. 4(A) is a view illustrating a behavior of the combustible mixture according to a prior art.

As represented by a solid line in FIG. 4(A), the thus formed combustible mixture has a flat shape with its length being shorter than the width thereof, and rises in nearly the direction of the length. Therefore, the combustible mixture (M) stays contacted with the igniting position (P) of the spark plug for only a relative short period of moving over a distance (L1), and the ignition timing must come within this relative short period. Therefore, when the timing for forming the combustible mixture is deviated even slightly due to a slight deviation in the fuel injection timing, the combustible mixture may often have passed over the spark plug already at the ignition timing making it difficult to reliably ensure the ignition performance.

Figure 3A:
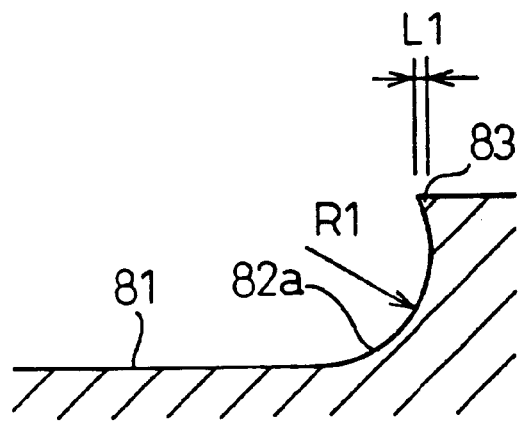
FIG. 3(A) is an (A)—(A) sectional view of a side wall of a cavity in FIG. 2.
Figure 3B:
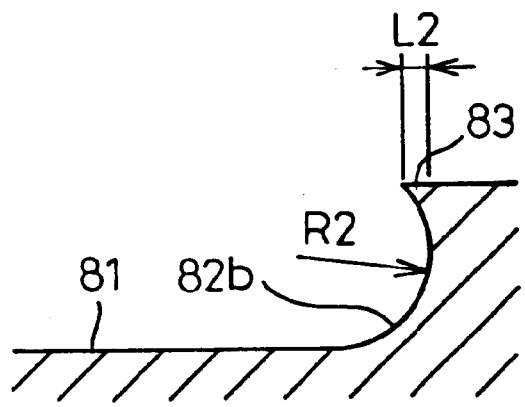
FIG. 3(B) is a (B)—(B) sectional view of the side wall of the cavity in FIG. 2.
Figure 3C:
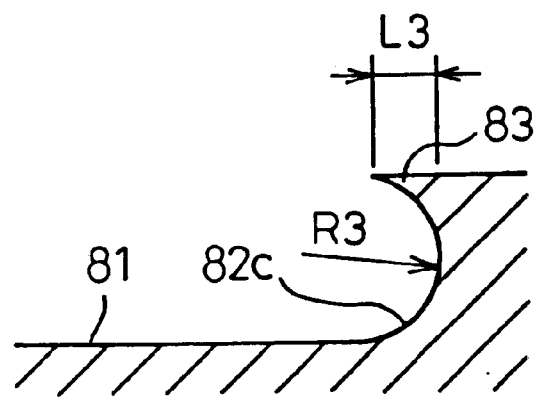
FIG. 3(C) is a (C)—(C) sectional view of the side wall of the cavity in FIG. 2.

The present invention is to solve this problem. According to the embodiment, the side wall 82 of the cavity 8 formed in the top surface of the piston 5 has a return portion 83 at an upper end thereof to protrude toward the inside of the cavity 8 at least over a range at where the fuel arrives, exhibiting an arcuate shape of a radius of curvature (r1) in the horizontal direction. FIGS. 3(A)–(C) are a vertical sectional view of the side wall in this range. A vertical center plane (N1) at the center of the side wall 82 in a range at where the fuel arrives intersects a vertical center plane (N2) at the center of the fuel injected from the fuel injection valve 7 at 180 degrees; i.e., these planes are on a straight line. FIG. 3(A) is an (A)—(A) sectional view of FIG. 2, and shows a central side wall portion 82a closest to the spark plug located at an upper part nearly at the center of the cylinder. The central side wall portion 82a has an arcuate shape in cross section of a radius of curvature of (R1) inclusive of the return portion 83. The return portion 83 at the central side wall portion 82a has a length of protrusion of (L1). FIG. 3(B) is a (B)—(B) sectional view of FIG. 2, and shows a right side wall portion 82b on the right side of the central side wall portion 82a. The right side wall portion 82b has an arcuate shape in cross section of a radius of curvature of (R2) inclusive of the return portion 83. The return portion 83 at the right side wall portion 82b has a length of protrusion of (L2). FIG. 3(C) is a (C)—(C) sectional view of FIG. 2, and shows a left side wall portion 82c on the left side of the central side wall portion 82a. The left side wall portion 82c has an arcuate shape in cross section of a radius of curvature of (R3) inclusive of the return portion 83. The return portion 83 at the left side wall portion 82c has a length of protrusion of (L3). There exist the following relationships in the radii of curvature of the side wall portions in the vertical direction and in the lengths of protrusions of the return portion 83, i.e., R1>R2>R3 and L1<L2<L3.

The fuel injected into the thus constituted cavity 8 travels on the bottom wall 81 while spreading in the direction of width of the fuel, arrives at the side wall 82, and is deflected toward the center of width of the fuel due to the side wall 82 having an arcuate shape in the horizontal direction, and is further deflected toward this side and up due to the side wall portions having arcuate shapes in cross section. For easy explanation, it is presumed that the injected fuel is divided into three fuel segments in the radial direction, i.e., divided into a central fuel segment 9a, a right fuel segment 9b and a left fuel segment 9c. Then, the central fuel segment 9a is directed by the central side wall portion 82a to the spark plug 6 located at an upper portion nearly at the center of the cylinder, the right fuel segment 9b is directed thereto by the right side wall portion 82b, and the left fuel segment 9c is directed thereto by the left side wall portion 82c. Thus, the bottom wall 81 of the cavity 8 constitutes a central fuel leading passage, a right fuel leading passage and a left fuel leading passage for leading the central, right and left fuel segments 9a, 9b and 9c to the side wall 81, and the central, right and left side wall portions 82a, 82b and 82c constitute a central fuel deflection passage, a right fuel deflection passage and a left fuel deflection passage for deflecting the central, right and left fuel segments 9a, 9b and 9c to pass near the spark plug 6.

In each fuel deflection passage, the shorter the length of protrusion of the return portion 83 is, the shorter the length of the passage for passing the fuel becomes and, hence, the smaller the resistance of passage for passing the fuel becomes. In each fuel deflection passage, furthermore, the larger the radius of curvature of the arcuate shape in cross section is, the shorter the length of the passage for passing the fuel becomes and, hence, the smaller the resistance of passage for passing the fuel becomes, irrespective of whether the side wall portions have generally an arcuate shape as in the present embodiment or partly an arcuate shape in cross section in the vertical direction. In the present embodiment, therefore, the length of protrusion of the return portion 83 and the radius of curvature in the arcuate shape in cross section differ as described above in the fuel deflection passages, so that the central fuel segment 9a passing on the central fuel deflection passage 9a leaves from the cavity 8 at the earliest timing and heads to the spark plug 6 at the highest speed. The right fuel segment 9b passing on the right fuel deflection passage leaves from the cavity 8 at the second earliest timing and heads to the spark plug 6 at the second highest speed. The left fuel segment 9c passing on the left fuel deflection passage leaves from the cavity 8 at the last timing and heads to the spark plug 6 at the lowest speed.

Figure 4B:
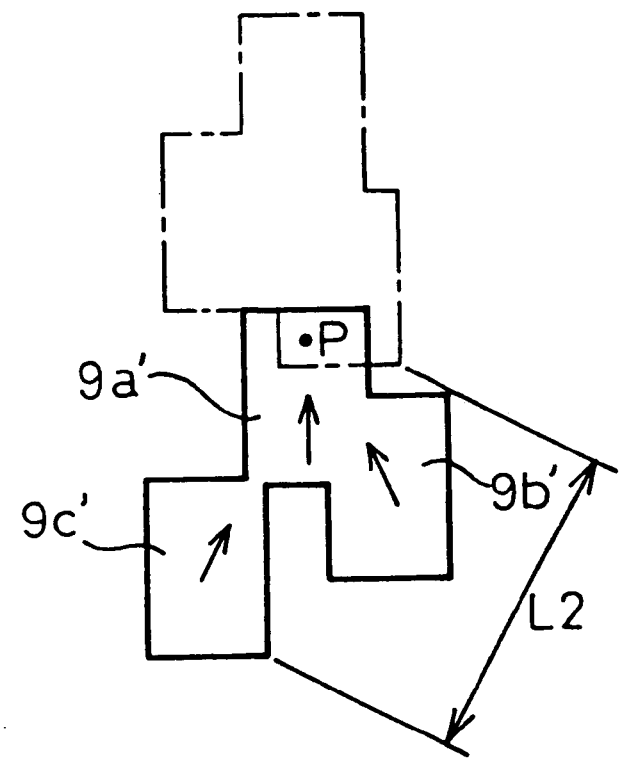
FIG. 4(B) is a view illustrating a behavior of the combustible mixture according to the first embodiment of the present invention.

As shown in FIG. 4(B), therefore, the combustible mixture 9a' formed by the central fuel segment 9a arrives at the vicinity of the spark plug 6 at the earliest timing, the combustible mixture 9b' formed by the right fuel segment 9b arrives at the vicinity of the spark plug 6 next, and the combustible mixture 9c' formed by the left fuel segment 9c arrives at the vicinity of the spark plug 6 last. These combustible mixtures are formed by the fuel that is continuously spreading, and do not exist completely independent from each other but are overlapped and linked at their peripheral portions as shown in FIG. 4(B).

Thus, according to the present embodiment, when the fuel injected from the fuel injection valve in nearly the shape of a fan having a relative small thickness is considered as being divided into a plurality of fuel segments in a radial direction, the combustible mixtures formed by the plurality of fuel segments are permitted to pass continuously near the spark plug 6 in a linked manner. That is, in the present embodiment, the ignition timing may extend from when the combustible mixture 9a' formed by the central fuel segment 9a starts contacting to the igniting position (P) (indicated by a solid line in FIG. 4(B)) until the combustible mixture 9c' formed by the left fuel segment 9c is still contacting to the igniting position (P) (indicated by a dotted line in FIG. 4(B)). In other words, the ignition may be executed while the combustible mixture 9c' formed by the left fuel segment 9c that arrives at the spark plug 6 last, is moving over the distance (L2).

As described above, the moving speed of the combustible mixture 9c' becomes slow, i.e., becomes slower than the moving speed of the combustible mixture according to the prior art shown in FIG. 4(A). Besides, the distance (L2) is sufficiently longer than the above-mentioned distance (L1). According to the present embodiment, therefore, the combustible mixture stays contacted to the igniting position (P) for a relatively long period. Despite the timing for forming the combustible mixture being slightly deviated due to a slight deviation in the fuel injection timing, therefore, it is not likely that the combustible mixture will have passed over the spark plug already at the ignition timing, and thus the reliable ignition performance can be ensured.

In the present embodiment and some of the embodiments that will be described below, it is explained that the fuel injected in nearly the shape of a fan is divided into three fuel segments. However, the ignition performance can be obviously improved if the injected fuel is divided into at least two fuel segments and if the combustible mixtures formed by these fuel segments are allowed to successively pass near the spark plug. The combustible mixtures formed by the plurality of fuel segments need not all pass near the spark plug, but the combustible mixtures formed by at least two fuel segments may successively pass near the spark plug.

In the central side wall portion 82a, the right side wall porion 82b and the left side wall portion 82c, furthermore, at least one of the radius of curvature of the arcuate shape in cross section and the length of protrusion of the return portion 83 may be continuously changed as shown in FIG. 2. This, in other words, means that the fuel injected in nearly the shape of a fan is divided into very many fuel segments and the combustible mixtures formed by these fuel segments can successively pass near the spark plug 6, and thus the combustible mixtures formed by the fuel segments are favorably linked and the propagation of flame can be very favorably improved. In the present embodiment, inclusive of some of the embodiments that will be described below, furthermore, the passage of the fuel segment for forming the combustible mixture that arrives first at the spark plug 6 is located closest to the spark plug 6, so that the combustible mixture is allowed to arrive at the spark plug 6 at an early timing. This makes it possible to further lengthen the period in which the combustible mixture stays contacted to the spark plug and, hence, to ensure more reliable ignition performance.

Figure 5:
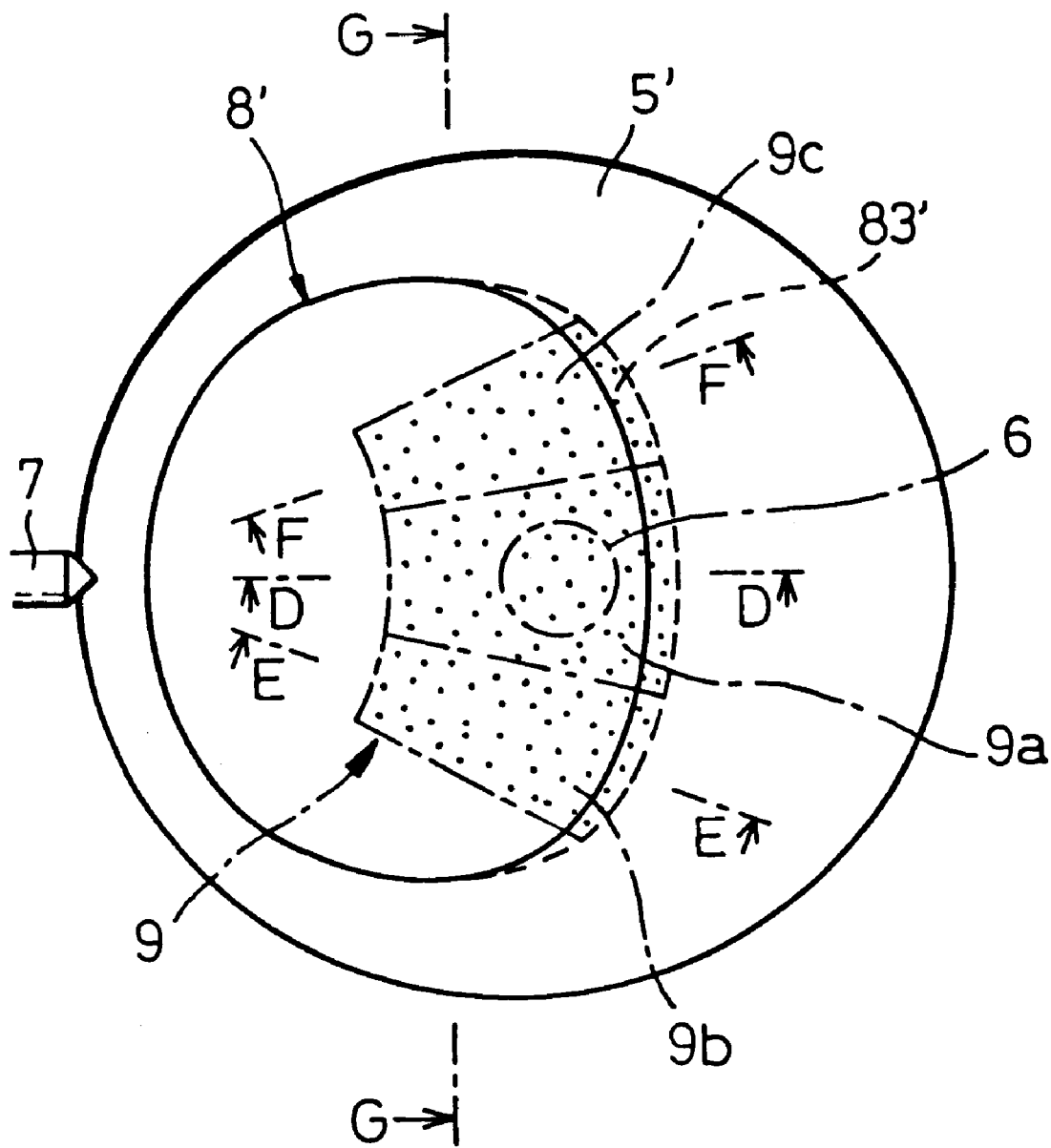
FIG. 5 is a plan view of a piston corresponding to that of FIG. 2.
Figure 6A:
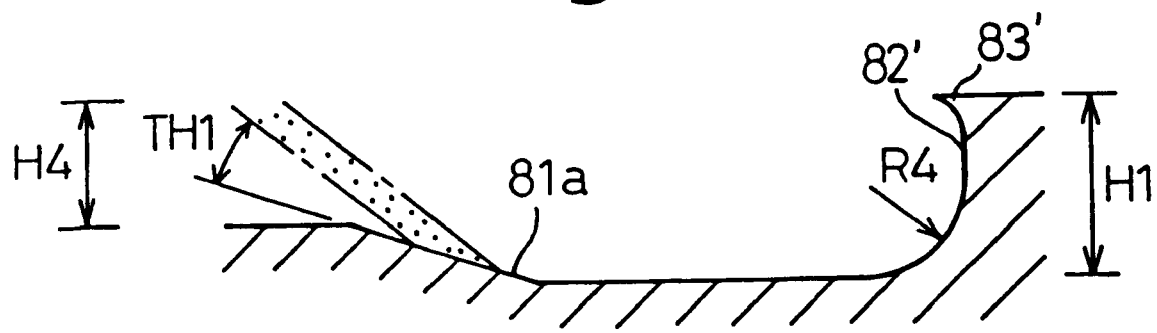
FIG. 6(A) is a (D)—(D) sectional view showing a side wall of a cavity shown in FIG. 5, and illustrates the direct cylinder injection-type spark ignition internal combustion engine according to a second embodiment of the present invention.
Figure 6B:
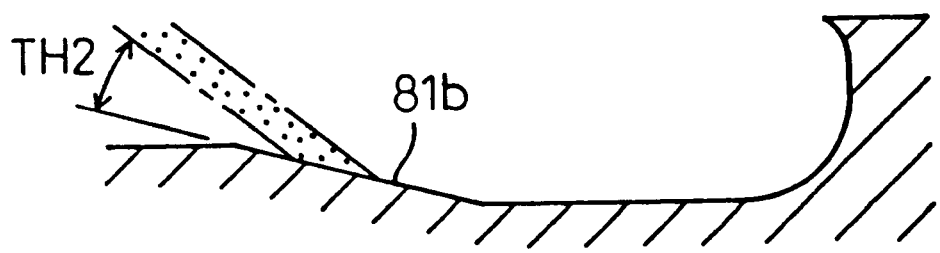
FIG. 6(B) is an (E)—(E) sectional view of the side wall of the cavity shown in FIG. 5 in the second embodiment of the present invention.
Figure 6C:
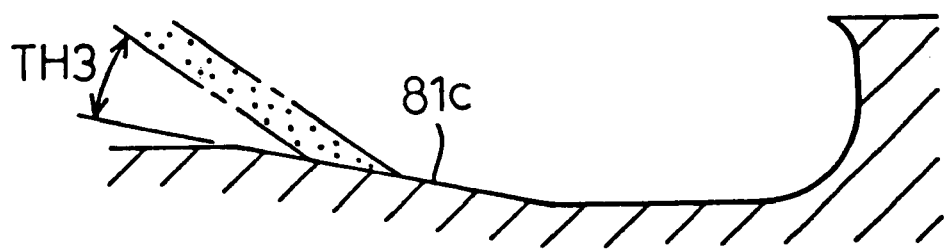
FIG. 6(C) is an (F)—(F) sectional view of the side wall of the cavity shown in FIG. 5 in the second embodiment of the present invention.

FIG. 5 is a plan view of a piston corresponding to the piston shown in FIG. 2, and illustrates the direct cylinder injection-type spark ignition internal combustion engine according to a second embodiment of the present invention. A cavity 8' formed in the top surface of the piston 5' in the present embodiment has the same shape as the cavity 8 formed in the top surface of the piston 5 of the first embodiment except for the points described below. A side wall 82' of the cavity 8' has a return portion 83' at an upper end thereof at least over a range at where the fuel arrives, and the length of protrusion of the return portion 83' is the same at any position. FIG. 6(A) is a (D)—(D) sectional view of FIG. 5, FIG. 6(B) is an (E)—(E) sectional view of FIG. 5, and FIG. 6(C) is an (F)—(F) sectional view of FIG. 5. As shown in these drawings, the side wall 82' of the cavity 8' has a partly arcuate shape in cross section of the same radius of curvature (R4) at least over a range where the fuel arrives. Therefore, the central, right and left fuel deflection passages for deflecting the fuel segments toward the spark plug 6, have nearly the same length of passage and nearly the same resistance to passage. As shown in FIGS. 6(A)–(C), however, the angle of inclination is different among the central fuel leading passage 81a, right fuel leading passage 81b and left fuel leading passage 81c at a position where the fuel collides. The central fuel leading passage 81a has the smallest angle (TH1) of collision of fuel, the right fuel leading passage 81b has the next small angle (TH2) of collision of fuel, and the left fuel leading passage 81c has the largest angle (TH3) of collision of fuel.

When the fuel collides with these fuel leading passages, therefore, the central fuel segment 9a loses the energy least, the right fuel segment 9b loses energy next least, and the left fuel segment 9c loses energy most. Thus, as in the first embodiment, the combustible mixture formed by the central fuel segment 9a arrives at the spark plug 6 earliest, the combustible gas formed by the right fuel segment 9b arrives at the spark plug 6 next, and the combustible mixture formed by the left fuel segment 9c arrives at the spark plug 6 last. Therefore, the same effects as described above can be obtained. In the cavity 8' in the present embodiment, the depth (H1) is nearly the same in the vicinity of the side wall in each fuel leading passage, and the depth (H4) is nearly the same at the start point of inclination on where the fuel collides. On the bottom wall of the cavity 8', it is also allowable to gradually change the angle of inclination of each fuel leading passage. As in the above-mentioned embodiment, therefore, favorably linked combustible mixtures are formed and thus a favorable stratified charge combustion can be realized.

Figure 7A:
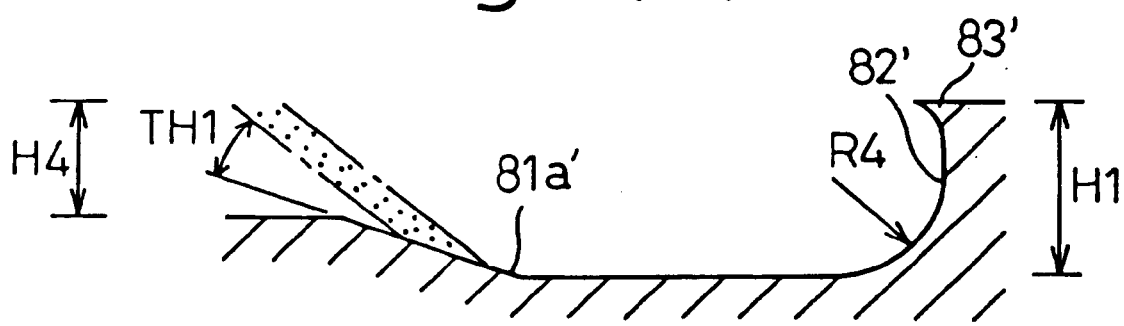
FIG. 7(A) is a (D)—(D) sectional view showing the side wall of the cavity shown in FIG. 5, and illustrates the direct cylinder injection-type spark ignition internal combustion engine according to a third embodiment of the present invention.
Figure 7B:
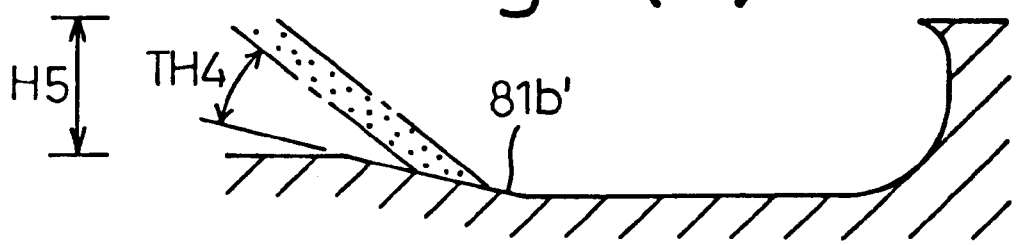
FIG. 7(B) is an (E)—(E) sectional view of the side wall of the cavity shown in FIG. 5 in the third embodiment of the present invention.
Figure 7C:
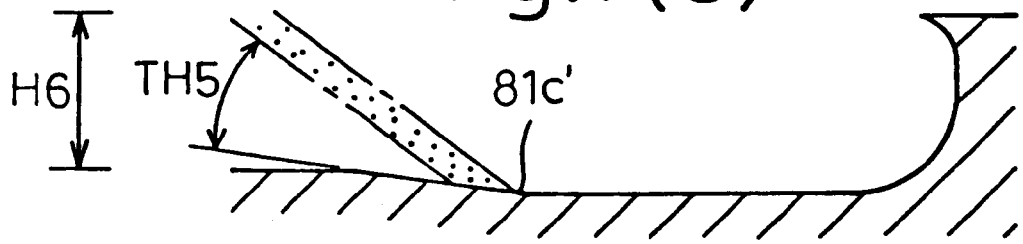
FIG. 7(C) is an (F)—(F) sectional view of the side wall of the cavity shown in FIG. 5 in the third embodiment of the present invention.

FIG. 7 is a view corresponding to FIG. 6, and illustrates the direct cylinder injection-type spark ignition internal combustion engine according to a third embodiment of the present invention. Described below are only differences from the second embodiment. FIG. 7(A) is a (D)—(D) sectional view of FIG. 5, FIG. 7(B) is an (E)—(E) sectional view of FIG. 5, and FIG. 7(C) is a (F)—(F) sectional view of FIG. 5. As shown in these drawings, the angles of inclination are different among the central fuel leading passage 81', right fuel leading passage 81b' and left fuel leading passage 81c' at positions where the fuel collides. The central fuel leading passage 81a' has the smallest angle (TH1) of collision of fuel, the right fuel leading passage 81b has the second smallest angle (TH4) of collision of fuel, and the left fuel guide passage 81c' has the largest angle (TH5) of collision of fuel.

When the fuel collides with these fuel leading passages, therefore, the central fuel segment 9a loses the energy least, the right fuel segment 9b loses energy next least, and the left fuel segment 9c loses energy most. It is thus allowed to obtain the effect same as that of the second embodiment. In the cavity in the present embodiment, the depth (H1) is nearly the same in the vicinity of the side wall in each fuel leading passage, but the depth (H4) is the smallest at the start point of inclination on where the fuel collides on the central fuel leading passage 81a', the depth (H5) is the second smallest at the start point of inclination on where the fuel collides on the right fuel leading passage 81b', and the depth (H6) is the greatest at the start point of inclination on where the fuel collides on the left fuel leading passage 81c'. On the bottom wall of the cavity, it is also allowable to gradually change the angle of inclination of each fuel leading passage. Like in the above-mentioned embodiment, therefore, favorably linked combustible mixtures are formed and thus a favorable stratified charge combustion can be realized.

Figure 8A:
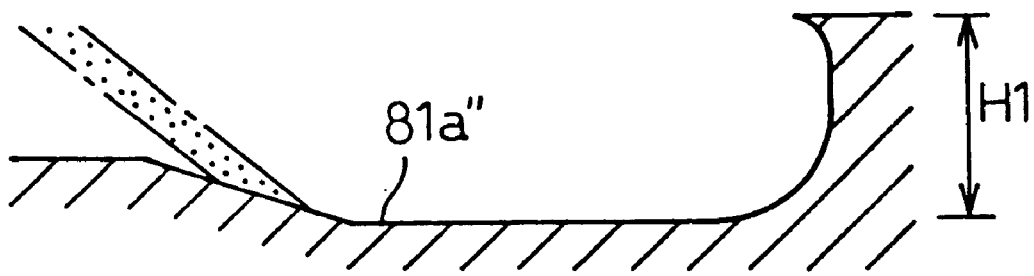
FIG. 8(A) is a (D)—(D) sectional view showing the side wall of the cavity shown in FIG. 5, and illustrates the direct cylinder injection-type spark ignition internal combustion engine according to a fourth embodiment of the present invention.
Figure 8B:
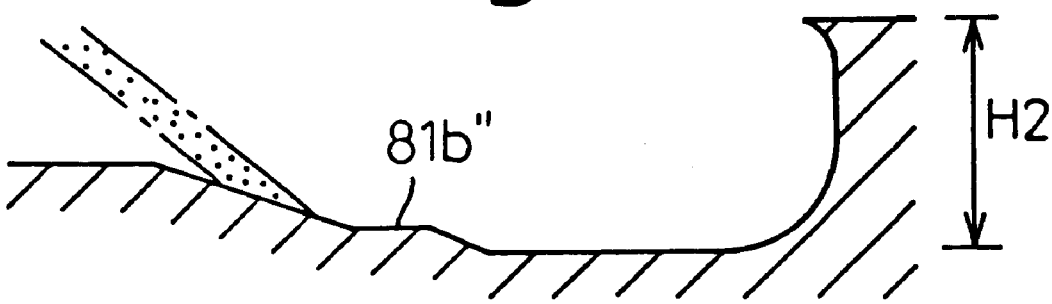
FIG. 8(B) is an (E)—(E) sectional view of the side wall of the cavity shown in FIG. 5 in the fourth embodiment of the present invention.
Figure 8C:
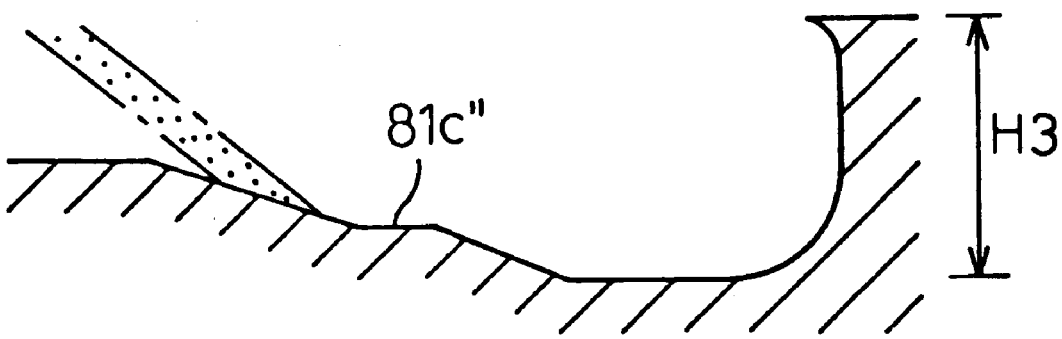
FIG. 8(C) is an (F)—(F) sectional view of the side wall of the cavity shown in FIG. 5 in the fourth embodiment of the present invention.

FIG. 8 is a view corresponding to FIG. 6, and illustrates the direct cylinder injection-type spark ignition internal combustion engine according to a fourth embodiment of the present invention. Described below are only differences from the second embodiment. FIG. 8(A) is a (D)—(D) sectional view of FIG. 5, FIG. 8(B) is an (E)—(E) sectional view of FIG. 5, and FIG. 8(C) is a (F)—(F) sectional view of FIG. 5. As shown in these drawings, the angles of inclination are nearly the same among the fuel leading passages at positions where the fuel collides. Here, however, the depth (H1) is the smallest near the side wall in the central fuel leading passage 81a", the depth (H2) is the second smallest near the side wall in the right fuel leading passage 81b", and the depth (H3) is the largest near the side wall in the left fuel leading passage 81c".

Therefore, the central fuel leading passage 81a" is the shortest, the right fuel leading passage 81b" is the second shortest, and the left fuel leading passage 81c" is the longest. As in the first embodiment, therefore, the combustible mixture formed by the central fuel segment 9a arrives at the spark plug 6 earliest, the combustible mixture formed by the right fuel segment 9b arrives at the spark plug 6 next earliest, and the combustible mixture formed by the left fuel segment 9c arrives at the spark plug 6 last, to accomplish the effect same as the one mentioned above. In the present embodiment, too, the depth near the side wall in the fuel leading passages may be gradually changed to form favorably linked combustible mixtures.

FIG. 9 is a plan view of a piston corresponding to FIG. 5, and illustrates the direct cylinder injection-type spark ignition internal combustion engine according to a fifth embodiment of the present invention. A cavity 8" formed in the top surface of the piston 5" according to the present embodiment has the same shape as the cavity 8' formed in the top surface of the piston 5' of the second embodiment except the points described below. In the present embodiment, the angles of inclination are nearly the same among the fuel leading passages at positions on where the fuel collides. Here, however, a convex resisting portion 10 is formed on the central fuel leading passage which portion extends in the direction of width of the central fuel segment. Two convex resisting portions 10 are formed on the right fuel leading passage, which portions extend in the direction of width of the right fuel segment. Three convex resisting portions 10 are formed on the left fuel leading passage, which portions extend in the direction of width of the left fuel segment.

Depending upon the number of convex resisting portions on the fuel leading passages, therefore, the central fuel leading passage has the smallest resistance of passage, the right fuel leading passage has the second smallest resistance of passage, and the left fuel leading passage has the largest resistance of passage. As in the first embodiment, therefore, the combustible mixture formed by the central fuel segment 9a arrives at the spark plug 6 earliest, the combustible mixture formed by the right fuel segment 9b arrives at the spark plug 6 next earliest, and the combustible mixture formed by the left fuel segment 9c arrives at the spark plug 6 last, to accomplish the effect same as the one described above.

In the present embodiment, the convex resisting portions are formed on the fuel leading passages. Based on the same idea, however, the convex resistance portion may be formed on the fuel deflection passages. The resistance of passage can similarly be increased even by forming the resisting portions in a concave manner instead of convex manner. Instead of or in addition to varying the number of the convex or concave resisting portions, the height or depth of the convex or concave resisting portions may differ vary the resistance of passage in the fuel leading passages. No resisting portion may be formed on the fuel leading passage or on the fuel deflection passage that should have the smallest resistance of passage.

FIG. 10 is a plan view of a piston corresponding to the piston shown in FIG. 5, and illustrates the direct cylinder injection-type spark ignition internal combustion engine according to a sixth embodiment of the present invention. A cavity 800 formed in the top surface of the piston 500 according to the present embodiment has the same shape as the cavity 8' formed in the top surface of the piston 5' of the second embodiment except the points described below. In the present embodiment, the bottom wall of the cavity 800 is provided with four guide protuberances 20 for defining the central, right and left fuel leading passages. The guide protuberances 20 are nearly in parallel and are nearly symmetrical with respect to the vertical center plane (N2) at the center of the fuel. The thus defined central fuel leading passage leads the central fuel segment to the central fuel deflection passage almost without deflecting it. However, the right and left fuel leading passages lead the right and left fuel segments to the right and left fuel deflection passages by deflecting them in the horizontal direction, and impart resistance to passage of the right and left fuel segments.

In the side wall of the cavity 800, the arc in the horizontal direction over a range at where the fuel arrives has a radius of curvature (r2) smaller than the radius of curvature (r1) of the cavity 8' of the second embodiment, whereby the right and left fuel deflection passages work to favorably defect the fuel, that is deflected in the horizontal direction by the right and left fuel leading passages, toward the spark plug 6. Thus, the combustible mixture formed by the central fuel segment arrives at the spark plug 6 earliest, and the combustible mixtures formed by the right and left fuel segments arrive at the spark plug 6 next earliest, contributing to extending the period in which the combustible mixtures stay contacted to the spark plug to accomplish the effect same as the one described above.

In the present embodiment, the right and left fuel leading passages have nearly the same resistance to passage, and the combustible mixtures formed by the right and left fuel segments arrive at the spark plug 6 nearly simultaneously. Upon tilting the guide protuberance defining, for example, the left fuel leading passage toward the vertical center plane at the center of the fuel, however, the left fuel segment is deflected in an increased degree in the horizontal direction, and the resistance to passage through the left fuel leading passage can be increased compared with that through the right fuel leading passage, enabling the combustible mixtures formed by the fuel segments to successively pass near the spark plug.

Figure 11:
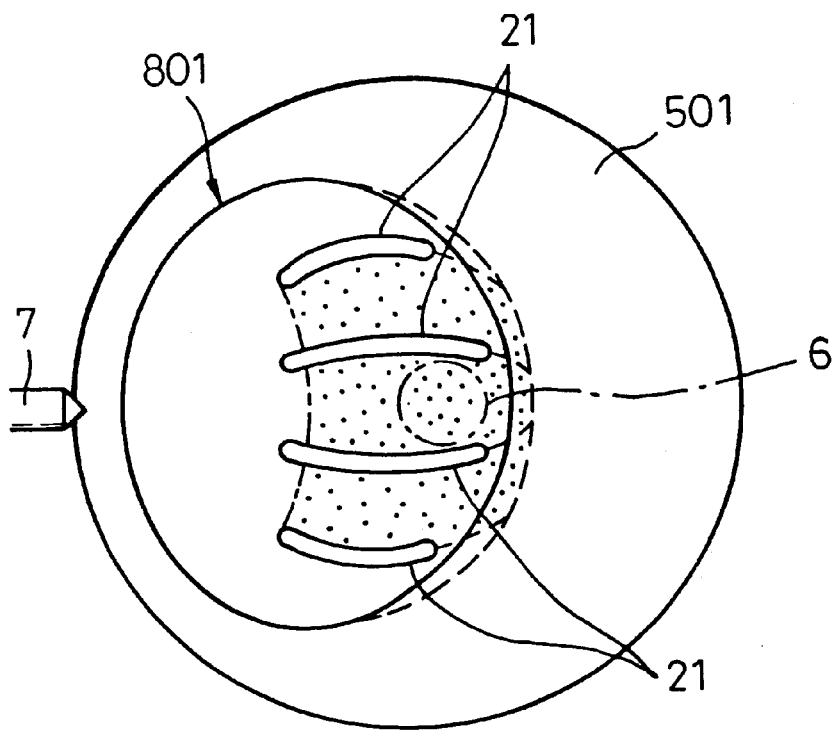
FIG. 11 is a plan view of a piston illustrating the direct cylinder injection-type spark ignition internal combustion engine according to a seventh embodiment of the present invention.

FIG. 11 is a plan view of a piston corresponding to the piston shown in FIG. 10, and illustrates the direct cylinder injection-type spark ignition internal combustion engine according to a seventh embodiment of the present invention. A cavity 801 formed in the top surface of the piston 501 according to the present embodiment has the same shape as the cavity 800 formed in the top surface of the piston 500 of the sixth embodiment except the points described below. In the present embodiment, the bottom wall of the cavity 801 is provided with four guide protuberances 21 for defining the central, right and left fuel leading passages. The guide protuberances 20 are curved inward with respect to the vertical center plane (N2) at the center of the fuel and are nearly symmetrical with respect to the vertical center plane (N2) at the center of the fuel. The farther the guide protuberance is from the vertical center plane (N2) at the center of the fuel, the smaller radius of curvature it has. The thus defined central fuel leading passage leads the central fuel segment to the central fuel deflection passage almost without deflecting it. However, the right and left fuel leading passages lead the right and left fuel segments to the right and left fuel deflection passages by deflecting them in the horizontal direction, and impart resistance of passage to the right and left fuel segments, making it possible to lengthen the period in which the combustible mixtures stay contacted to the spark plugs in the same manner as in the sixth embodiment to obtain the same effect as the one described above. In the present embodiment, too, the resistance of passage may be differed between the right fuel leading passage and the left fuel leading passage based on the same idea as in the sixth embodiment, so that the combustible mixtures formed by the fuel segments successively pass near the spark plug.

Figure 12:
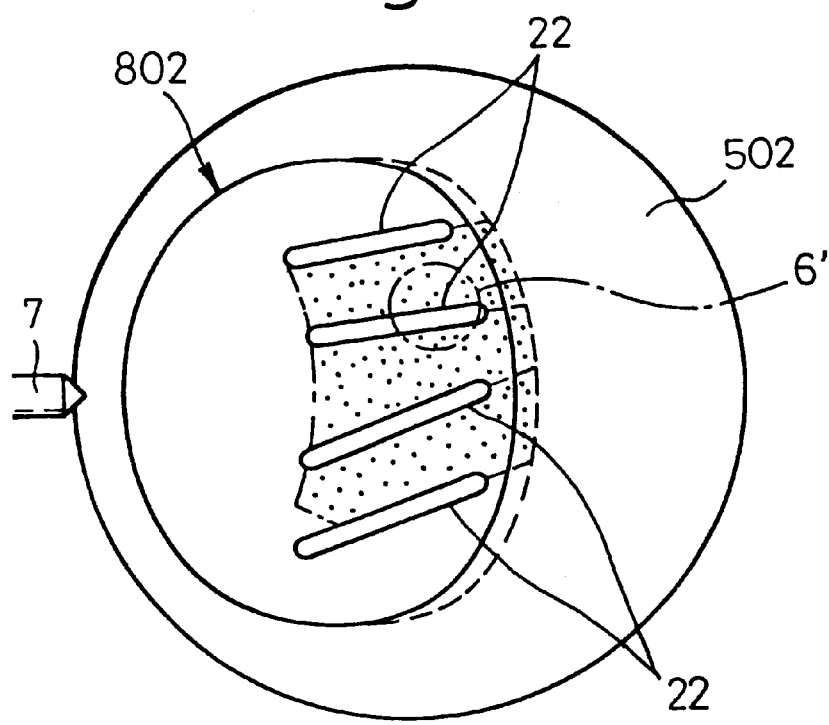
FIG. 12 is a plan view of a piston illustrating the direct cylinder injection-type spark ignition internal combustion engine according to an eighth embodiment of the present invention.

FIG. 12 is a plan view of a piston corresponding to the piston shown in FIG. 5, and illustrates the direct cylinder injection-type spark ignition internal combustion engine according to an eighth embodiment of the present invention. A cavity 802 formed in the top surface of the piston 502 of the present embodiment has the same shape as the cavity 8' formed in the top surface of the piston 5' of the second embodiment except for the points described below. In the present embodiment, the bottom wall of the cavity 802 has nearly the same angle of inclination at positions where the fuel collides, and is provided with a plurality of deflection guide protuberances 22 for deflecting all the fuel injected in nearly the form of a fan toward the left in the direction of width of the fuel. The deflection guide protuberances 22 located on the deflecting side, i.e., on the left side are tilted less than the deflection guide protuberances 22 located on the right side. The spark plug 6' is slightly deflected toward the left side.

Figure 14:
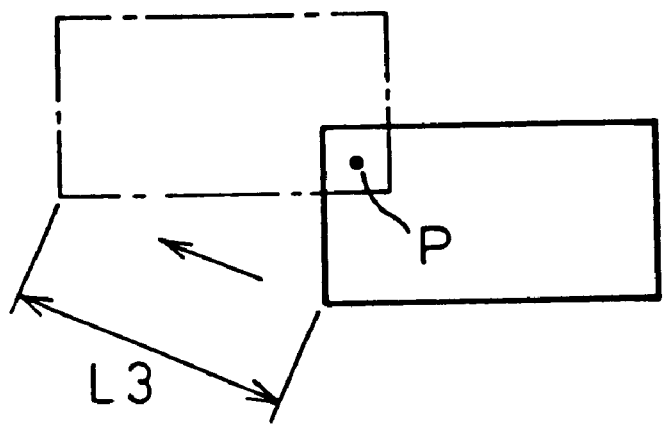
FIG. 14 is a view illustrating another behavior of the combustible mixture according to the eighth embodiment of the present invention.

As the fuel deflected by the deflection guide protuberances 22 is further deflected toward this side and up by the side wall of the cavity 802, the combustible mixture formed by the deflected fuel moves aslant from the right lower side toward the left upper side as viewed on a plane with respect to the spark plug 6 that is deflected toward the left side as shown in FIG. 14 that corresponds to FIG. 4(A). The moving speed of the combustible mixture (M) is determined by the kinetic energy possessed by the injected fuel, and is considered to be nearly the same between the conventional case shown in FIG. 4(A) and the case of the present embodiment shown in FIG. 14. According to the present embodiment as described above, the combustible mixture (M) is contacting to the igniting position (P) while the combustible mixture (M) is moving over the distance (L3). Since the distance (L3) is much longer than the above-mentioned distance (L1), reliable ignition is ensured at the ignition timing despite of a slight deviation in the timing for forming the combustible mixture caused by a slight deviation in the fuel injection timing.

In the present embodiment, the deflection guide protuberance 22 located on the left side is tilted less than the deflection guide protuberance 22 located on the right side. On the bottom wall of the cavity 802, therefore, the left side of the fuel is not so much deflected toward the left. Since the left side of the combustible mixture slowly moves toward the left side, therefore, the combustible mixture hardly comes into contact with the cylinder bore. It is thus made possible to prevent the occurrence of a problem in that the engine oil is diluted with fuel that adheres to the cylinder bore.

In the present embodiment, the deflection guide protuberances 22 are formed on the bottom wall of the cavity, i.e., on the fuel leading passages. However, the deflection guide protuberances 22 may be formed on the side wall of the cavity, i.e., on the fuel deflection passages. In this case, the fuel deflection passages deflect the fuel not only toward this side and up but also deflect the fuel toward the left in the direction of width of the fuel. In the present embodiment and the embodiments that will be described below, the spark plug may be disposed nearly at the center of the cylinder. In this case, the motion of the combustible mixture toward the upper aslant direction approaches the vertical direction. Here, the combustible mixture stays contacted to the igniting position while it moves over a distance longer than the distance of the prior art, and the period in which the combustible mixture stays contacted to the spark plug is extended, making it possible to reliably ensure the ignition performance at the ignition timing.

Figure 13:
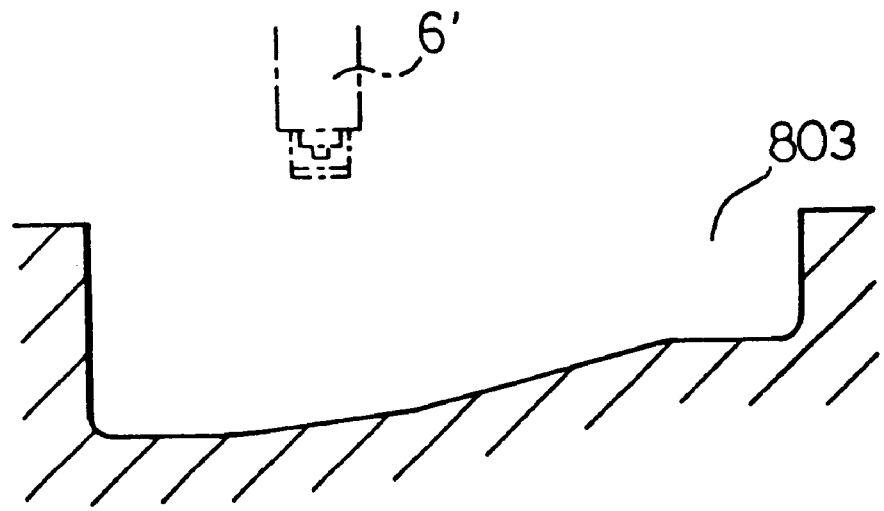
FIG. 13 is a sectional view along the line (G)—(G) in FIG. 5, and illustrates the direct cylinder injection-type spark ignition internal combustion engine according to a ninth embodiment of the present invention.

FIG. 13 is a view corresponding to (G)—(G) sectional view of FIG. 5, and illustrates the direct cylinder injection-type spark ignition internal combustion engine according to a ninth embodiment of the present invention. According to the present embodiment, the bottom wall of the cavity 803 is inclined from the right side end of fuel toward the left side end thereof. Therefore, the leftward deflecting force acts on the fuel traveling on the bottom wall, whereby the combustible mixture moves as shown in FIG. 14 and, as in the eighth embodiment, the period is lengthened in which the combustible mixture stays contacted to the spark plug, and reliable ignition performance is ensured at the ignition timing.

In the present embodiment, the angle of inclination on the bottom wall of the cavity 803 is smaller at the left side end of the fuel than at the right side end of the fuel, so that the left side of the fuel is not strongly deflected toward the left on the bottom wall of the cavity 803. Therefore, the left side of the combustible mixture slowly moves toward the left side and the combustible mixture hardly comes into contact with the cylinder bore. This prevents such a problem that the engine oil is diluted with fuel that adheres on the cylinder bore.

Figure 15:
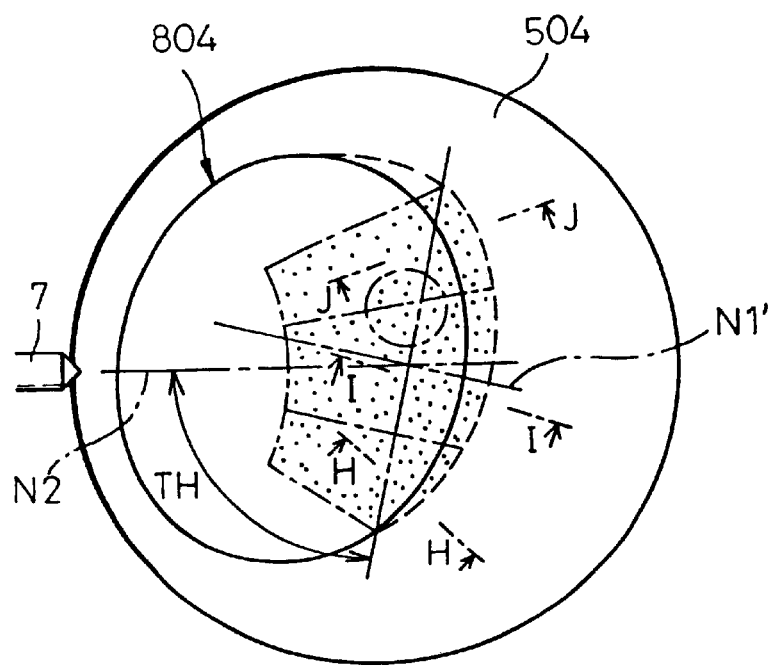
FIG. 15 is a plan view of a piston illustrating the direct cylinder injection-type spark ignition internal combustion engine according to a tenth embodiment of the present invention.

FIG. 15 is a plan view of a piston corresponding to FIG. 2, and illustrates a direct cylinder injection-type spark ignition internal combustion engine according to a tenth embodiment of the present invention. A cavity 804 formed in the top surface of the piston 504 according to the present embodiment has the same shape as the cavity 8 formed in the top surface of the piston 5 of the first embodiment except the points described below, and is turned by a predetermined angle in the clockwise direction about the axis in the vertical direction. In the present embodiment, a vertical center plane (N1') at the center of the side wall in the range at where the fuel arrives intersects a vertical center plane (N2) at the center of the fuel injected from the fuel injection valve 7 at a predetermined obtuse angle (TH), and the spark plug 6' is slightly deviated toward the left direction.

The thus constituted side wall deflects the fuel upward along the vertical center plane (N1') at the center. If viewed from the spark plug 6', therefore, the combustible mixture formed by the fuel moves leftward as it rises. Like in the eighth embodiment, therefore, the combustible mixture moves as shown in FIG. 14, whereby the combustible mixture stays contacted to the spark plug for an extended period making it possible to reliably ensure the ignition performance at the ignition timing.

As for the sectional shape of the side wall in the vertical direction over a range at where the fuel arrives according to the present embodiment, the (J)—(J) section of the left side corresponds to FIG. 3(C), the (I)—(I) section at the center corresponds to FIG. 3(B), and the (H)—(H) section of the right side corresponds to FIG. 3(A). Therefore, the rising speed becomes slow toward the left side of the fuel and, at the ignition timing, the moving amount of this portion toward the left with respect to the spark plug 6' decreases. Thus, the combustible mixture hardly comes into contact with the cylinder bore. In the present embodiment, the range of the side wall at where the fuel arrive is of an arcuate shape having a radius of curvature in the horizontal direction. Upon forming the left side porion of the side wall of this range to partly have a small radius of curvature, however, the moving speed of the left side of the fuel toward the left can be lowered to more reliably prevent the combustible mixture from coming into contact with the cylinder bore.

Figure 16:
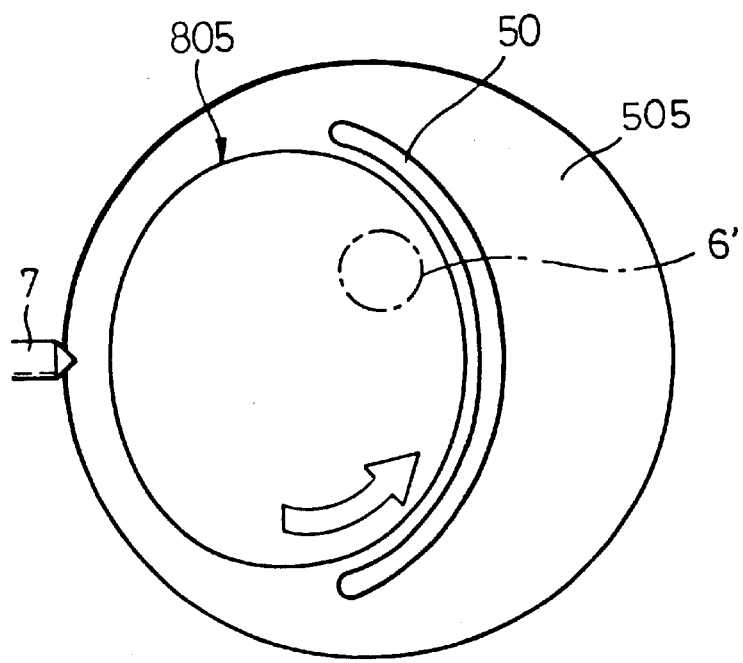
FIG. 16 is a plan view of a piston illustrating the direct cylinder injection-type spark ignition internal combustion engine according to an eleventh embodiment of the present invention.

FIG. 16 is a plan view of a piston and illustrates the direct cylinder injection-type spark ignition internal combustion engine according to an eleventh embodiment of the present invention. A cavity 805 formed in the upper surface of the piston 505 according to the present embodiment deflects the fuel that is injected in the shape of a flat fan having a relatively small thickness toward this side and upside. The spark plug 6' is deviated toward the left side. In the present embodiment, the intake port is so constituted as to form a counterclockwise swirl in the cylinder in the horizontal direction. Furthermore, a protruding portion 50 is formed on the top surface of the piston 505 to correspond to the side wall of the cavity 805 over a range at where the fuel arrives.

Therefore, a part of the swirl turns along the protruding portion and causes the combustible mixture formed by fuel which is deflected toward this side and upside to move toward the left. As in the eighth embodiment, therefore, the combustible mixture moves as shown in FIG. 14, whereby the combustible mixture stays contacted to the spark plug for an extended period making it possible to reliably ensure the ignition performance at the ignition timing.

Figure 17:
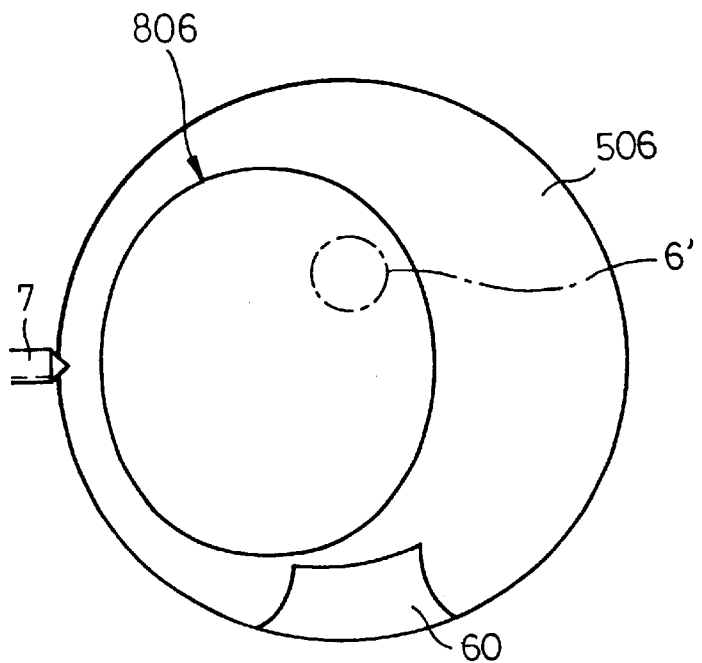
FIG. 17 is a plan view of a piston illustrating the direct cylinder injection-type spark ignition internal combustion engine according to a twelfth embodiment of the present invention.

FIG. 17 is a plan view of a piston and illustrates the direct cylinder injection-type spark ignition internal combustion engine according to a twelfth embodiment of the present invention. A cavity 806 formed in the upper surface of the piston 506 according to the present embodiment deflects the fuel that is injected in the shape of a flat fan having a relatively small thickness toward this side and upside. The spark plug 6' is slightly deviated toward the left side. In the present embodiment, a squish area 60 is formed in the top surface of the piston 506 to generate a squish that moves toward the left chiefly along the side wall of the cavity 806 over a range at where the fuel arrives.

Therefore, the squish makes the combustible mixture formed by the fuel which is deflected toward this side and up, move toward the left. As in the eighth embodiment, therefore, the combustible mixture moves as shown in FIG. 14, whereby the combustible mixture stays contacted to the spark plug for an extended period making it possible to reliably ensure the ignition performance at the ignition timing.

Figure 18:
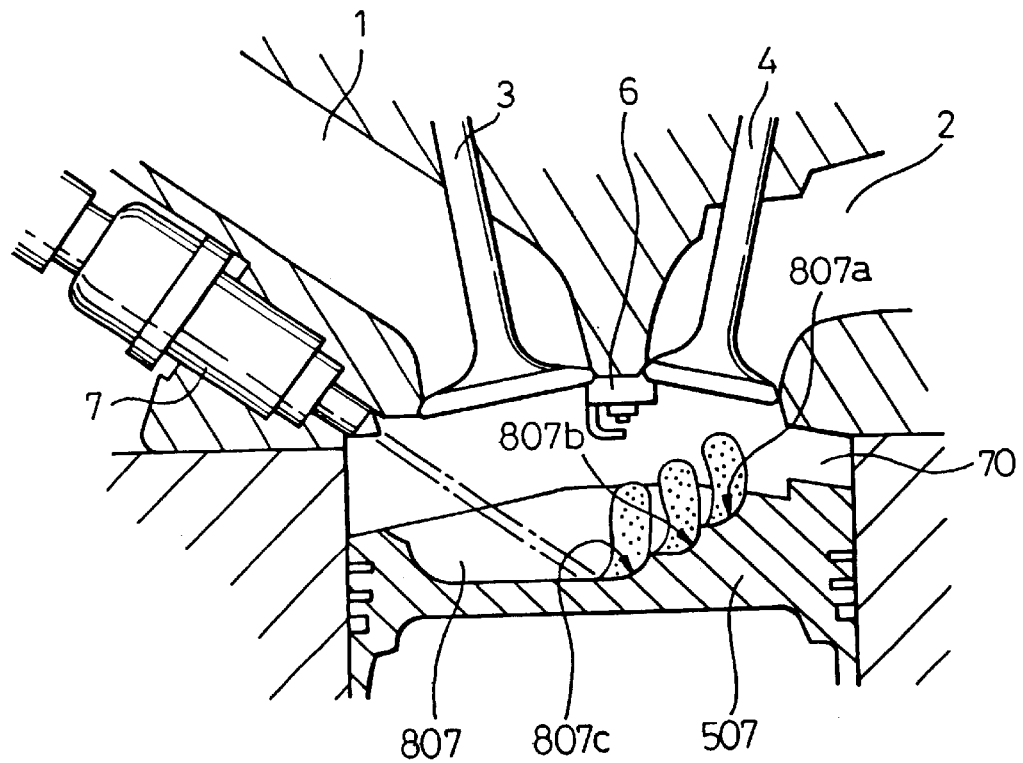
FIG. 18 is a vertical sectional view schematically illustrating the direct cylinder injection-type spark ignition internal combustion engine according to a thirteenth embodiment of the present invention.

FIG. 18 is a vertical sectional view schematically illustrating the direct cylinder injection-type spark ignition internal combustion engine according to a thirteenth embodiment of the present invention. Described below are only the differences from the first embodiment of FIG. 1. On the bottom wall of the cavity 807 according to the present embodiment, there are formed first, second and third stepped portions 807a, 807b and 807c with which will be successively collided with by the fuel injected from the fuel injection valve 7 accompanying the rise of the piston 507. In the top surface of the piston 507 is further formed a squish area 70 for generating a squish that travels toward the fuel injection valve from the side opposite to the fuel injection valve 7.

Even under the condition where the fuel is injected in a small amount on the low engine load side, the fuel injected from the fuel injection valve necessarily collides with the first and second stepped portions 807a and 807b. The first and second stepped portions 807a and 807b deflect the fuel in parallel and upward, and the thus deflected fuel is directed toward the upstream side of the squish from the spark plug 6. The fuel deflected by the first and second stepped portions 807a and 807b forms favorable combustible mixtures having a thickness larger than that of the above-mentioned embodiments, and moving toward the spark plug 6 due to the squish. In the present embodiment, therefore, the combustible mixture stays contacted to the spark plug in the direction of thickness for a relative long period. Therefore, the period in which the combustible mixture is contacted to the spark plug is lengthened compared to that of the prior art, and the ignition performance is reliably ensured at the ignition timing.

In the present embodiment, when the amount of injected fuel increases on the high engine load side, the fuel also collides with the third stepped portion 807c and is deflected upward. The combustible mixture formed by this fuel is located neighboring the combustible mixture formed by the fuel deflected upward by the second stepped portion 807b, contributing to further increase the thickness of the combustible mixture, to lengthen the period in which the combustible mixture moving in the direction of thickness stays contacted to the spark plug, and to more reliably ensure the ignition performance at the ignition timing.

Figure 19:
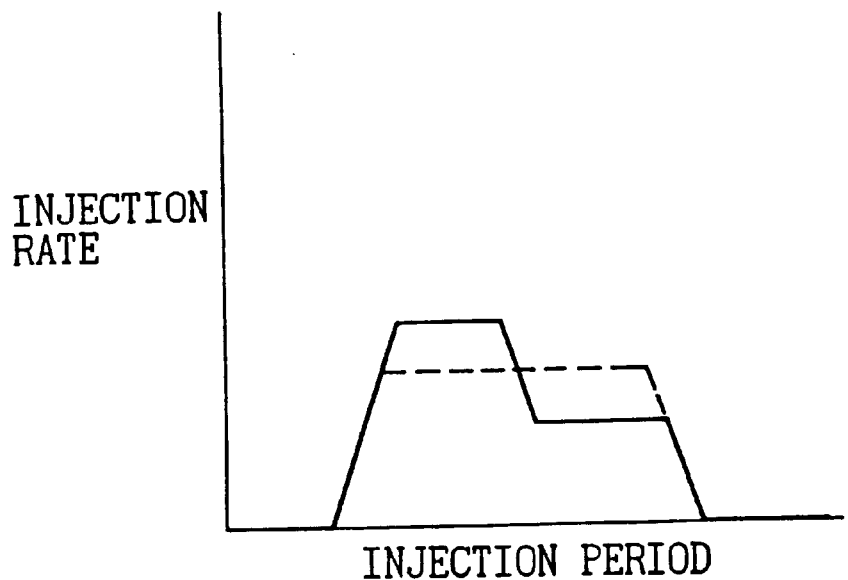
FIG. 19 is a diagram of a fuel injection pattern illustrating the direct cylinder injection-type spark ignition internal combustion engine according to a fourteenth embodiment of the present invention.

FIG. 19 shows a fuel injection pattern and illustrates the direct cylinder injection-type spark ignition internal combustion engine according to a fourteenth embodiment of the present invention. In FIG. 19, a dotted line represents a conventional fuel injection pattern and a solid line represents a fuel injection pattern according to the present embodiment in which the injection rate is increased in an early stage of fuel injection and is decreased in a last stage of fuel injection. This makes it possible to inject the fuel in the same amount within the same injection period. As the injection rate is decreased in the last stage of fuel injection, the fuel injected at this moment possesses a decreased amount of kinetic energy making it possible to extend the period until the combustible mixture arrives at the spark plug from when it was injected. This, in other words, lengthens the whole length of the combustible mixture, and the combustible mixture stays contacted to the spark plug for an extended period making it possible to reliably ensure the ignition performance at the ignition timing.

In the present embodiment, it is also possible not to increase the injection rate in the early stage of fuel injection. Accordingly, the period of fuel injection is extended. When the injection rate is decreased, the fuel is easily vaporized to form a combustible mixture, i.e., the combustible mixture is formed at an early time. Despite the fuel injection end timing is retarded, therefore, the injected fuel is all forming the combustible mixture at the ignition timing and no problem arouses. This means that the fuel can be injected in a further increased amount if the injection rate is increased in the early stage of fuel injection.

Despite the injection rate is increased in the early stage of fuel injection, the fuel injected at this moment forms a favorable combustible mixture over a sufficiently long period until the ignition timing. The fuel injection valve is generally so constructed that the injection rate varies depending upon the amount of lifting the needle valve. To decrease the injection rate in the last stage of fuel injection, therefore, the lifting amount of the needle valve may be decreased in the last stage of fuel injection. Moreover, the fuel injection valve generally injects fuel of a high pressure via a fuel reservoir of a small capacity. While the fuel injection valve is being opened, therefore, the fuel is fed to the fuel reservoir through the fuel feed passage. If the fuel feed passage is provided with a choke, therefore, fuel of a high pressure in the fuel reservoir is injected in the early stage of fuel injection. In the last stage of fuel, injection, however, the pressure of fuel in the fuel reservoir decreases, and the injection rate decreases.

Figure 20:
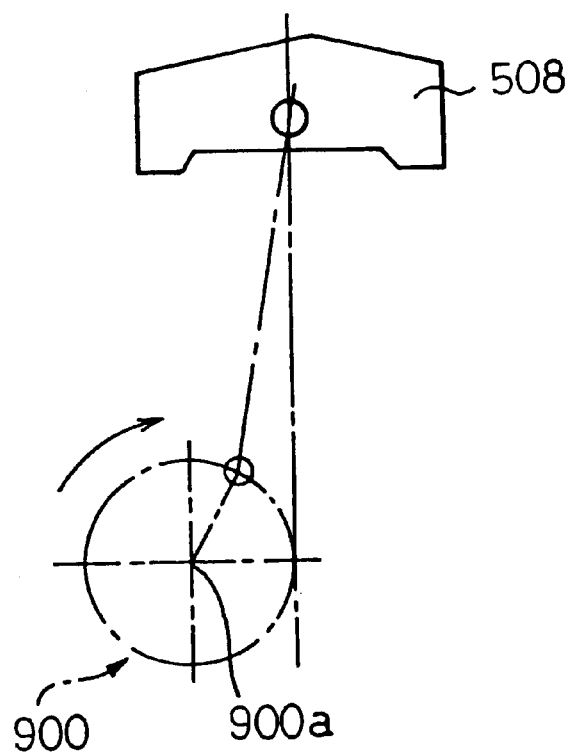
FIG. 20 is a view of a crank mechanism illustrating the direct cylinder injection-type spark ignition internal combustion engine according to a fifteenth embodiment of the present invention.

FIG. 20 is a diagram schematically showing a crank mechanism for illustrating the direct cylinder injection-type spark ignition internal combustion engine according to a fifteenth embodiment of the present invention, wherein the crank mechanism 900 of the present embodiment revolves in the clockwise direction, and the center 900a of revolution is deviated toward the left with respect to the center axis of a piston 508. Therefore, though the angular velocity of the crank is high when the piston 508 descends, the angular speed of the crank is low when the piston 508 ascends. In the present embodiment, the period in which the combustible mixture stays contacted to the spark plug is not extended. Despite the fuel injection timing being deviated to some extent in the compression stroke, however, the rising speed of the piston is slow so that the fuel can be injected at nearly a desired position of the piston, making it possible to reliably ensure the ignition performance.

According to the above-mentioned fourteenth embodiment, the internal combustion engine is not limited to the one in which the fuel is deflected toward the spark plug by the cavity in the top surface of the piston, but may be the one in which the fuel is vaporized while it is flying and is directly headed toward the spark plug, to extend the period in which the combustible mixture stays contacted to the spark plug compared to that of the prior art and to ensure reliable ignition performance. According to the fourteenth and fifteenth embodiments, the engine is not limited to the one in which the fuel is injected in nearly the shape of a fan, but may be the one in which the fuel is injected in a conical shape. These internal combustion engines, too, make it possible to ensure more reliable ignition performance than that of the prior art.

Although the invention has been described with reference to specific embodiments thereof, it should be apparent that numerous modification can be made thereto by these skilled in the art, without departing from the basic concept and scope of the invention.

What is claimed is:

1. A direct cylinder injection-type spark ignition internal combustion engine comprising a spark plug and a fuel injection valve for directly injecting fuel into the cylinder, wherein the fuel injected from said fuel injection valve passes near said spark plug directly or being deflected, and a crank mechanism has the center of the crank shaft deviated from the center axis of the piston so that the angular speed of the crank is lowered in the compression stroke.

* * * * *